(12) United States Patent  
Rapoport

(10) Patent No.: US 9,000,647 B2  
(45) Date of Patent: Apr. 7, 2015

(54) HIGH EFFICIENCY HIGH OUTPUT DENSITY ELECTRIC MOTOR

(76) Inventor: Uri Rapoport, Moshav Ben Shemen (IL)

(*) Notice: Subject to any disclaimer, the term of this patent is extended or adjusted under 35 U.S.C. 154(b) by 318 days.

(21) Appl. No.: 13/495,788

(22) Filed: Jun. 13, 2012

(65) Prior Publication Data

US 2012/0319518 A1    Dec. 20, 2012

Related U.S. Application Data

(60) Provisional application No. 61/497,536, filed on Jun. 16, 2011.

(51) Int. Cl.
 *H02K 1/27* (2006.01)
 *H02K 21/12* (2006.01)
 *H02K 21/24* (2006.01)

(52) U.S. Cl.
 CPC .......... *H02K 1/2793* (2013.01); *H02K 1/27* (2013.01); *H02K 21/12* (2013.01); *H02K 21/24* (2013.01); *H02K 2201/06* (2013.01)

(58) Field of Classification Search
 CPC ....... H02K 1/27; H02K 1/2793; H02K 21/12; H02K 21/24; H02K 2201/06
 USPC .............. 310/156.12, 156.37, 268, 156.36
 See application file for complete search history.

(56) References Cited

U.S. PATENT DOCUMENTS

| | | | |
|---|---|---|---|
| 5,396,140 A * | 3/1995 | Goldie et al. | 310/268 |
| 5,903,082 A | 5/1999 | Caamano | |
| 6,175,178 B1 * | 1/2001 | Tupper et al. | 310/166 |
| 6,259,233 B1 | 7/2001 | Caamano | |
| 6,455,969 B1 * | 9/2002 | Chen | 310/114 |
| 7,105,974 B2 | 9/2006 | Nashiki | |
| 2004/0195931 A1 * | 10/2004 | Sakoda | 310/268 |
| 2008/0088200 A1 * | 4/2008 | Ritchey | 310/268 |
| 2012/0319518 A1 * | 12/2012 | Rapoport | 310/156.12 |

* cited by examiner

*Primary Examiner* — John K Kim  
(74) *Attorney, Agent, or Firm* — The Law Office of Michael E. Kondoudis

(57) ABSTRACT

An electric motor that generates mechanical energy whilst increasing both the motor efficiency and the mechanical power density. The electric motor includes: a plurality of disk surfaces having a main longitudinal axis; a plurality of stationary support structures; and a rotating shaft affixed to the disk surfaces. Each disk surface is coupled to an array of offset magnets. The magnets are arranged as matching magnetic pairs on two adjacent disk surfaces to create a plurality of magnetic fields between the matching magnetic pairs. The magnetic fields are titled at an angle A with respect to the main longitudinal axis. Each stationary support structure has an electromagnetic coil array located in-between each of the matching magnetic pairs, which provides an axial magnetic field when voltage is applied on the electromagnetic coil. Each of the electromagnetic coil array is titled at said angle A with respect to the main longitudinal axis.

16 Claims, 7 Drawing Sheets

HIGH EFFICIENCY HIGH OUTPUT DENSITY ELECTRIC MOTOR

FIELD OF THE INVENTION

The present invention generally relates to mechanical power generation by rotational force generated via an electric motor.

The present invention particularly relates to a motor utilizing the force exerted by an interaction between the magnetic fields of a plurality of permanent magnet devices on the rotor and parallel magnetic fields of plurality electromagnetic coils on the stator.

BACKGROUND OF THE INVENTION

Motors, which are widely used all over the world in many instruments, come in various sizes and operational mode categories. The classic division of electric motors has been that of DC type's vs. AC types. A typical AC motor consists of an outside stationary stator having coils supplied with AC current to produce a rotating magnetic field, and an inside rotor attached to the output shaft that is given a torque by the rotating field.

The ongoing trend toward electronic control clutters the distinction, as modern drivers have moved the commutator out of the motor shell. For this new breed of motors, driver circuits are relied upon to generate sinusoidal AC drive currents or any other waveforms of desired shape. The two best examples are: the brushless DC motor, and the stepping motor, both being polyphase AC motors requiring external electronic control.

Conversion of electrical energy into mechanical energy by a motor via electromagnetic induction force is reverse to the operation of an electrical generator converting mechanical energy to electrical energy. Inasmuch as a motor and a generator reciprocate conversion of mechanical and electrical energy, based on physics principles there is a substantial correlation between the operation of an electric motor and an electrical generator.

The interrelation between electrical to mechanical energy conversion and the inverse mechanical to electrical energy conversion, has led electric motor developers throughout the years, to design electric motors with configurations adaptable to operate as electrical generators.

U.S. Pat. No. 5,903,082 enclosed herein by reference, discloses a device such as an electric motor, an electric generator, or a regenerative electric motor includes a rotor arrangement and a stator arrangement. The stator arrangement has a dielectric electromagnet housing and at least one energizable electromagnet assembly including an overall amorphous metal magnetic core. The overall amorphous metal magnetic core is made up of a plurality of individually formed amorphous metal core pieces. The dielectric electromagnet housing has core piece openings formed into the electromagnet housing for holding the individually formed amorphous metal core pieces in positions adjacent to one another so as to form the overall amorphous metal magnetic core. The device further includes a control arrangement that is able to variably control the activation and deactivation of the electromagnet using any combination of a plurality of activation and deactivation parameters in order to control the speed, efficiency, torque, and power of the device.

U.S. Pat. No. 6,259,233 enclosed herein by reference, discloses a device such as an electric motor, an electric generator, or a regenerative electric motor includes a rotor arrangement and a stator arrangement. The stator arrangement has a dielectric electromagnet housing and at least one energizable electromagnet assembly including an overall amorphous metal magnetic core. The overall amorphous metal magnetic core is made up of a plurality of individually formed amorphous metal core pieces. The dielectric electromagnet housing has core piece openings formed into the electromagnet housing for holding the individually formed amorphous metal core pieces in positions adjacent to one another so as to form the overall amorphous metal magnetic core. The device further includes a control arrangement that is able to variably control the activation and deactivation of the electromagnet using any combination of a plurality of activation and deactivation parameters in order to control the speed, efficiency, torque, and power of the device.

U.S. Pat. No. 7,105,974 enclosed herein by reference, discloses a synchronous AC motor has a stator with stator poles arranged as a plurality of circumferentially extending stator pole groups, with each stator pole group having a pair of corresponding circumferentially extending loop-configuration stator windings disposed adjacent on either side or a single such winding disposed adjacent at one side, adjacent stator pole groups being mutually circumferentially displaced by a fixed amount corresponding to a specific electrical phase angle. Applying respective polyphase AC voltages to the windings produces a rotating magnetic field, such that currents of mutually opposite direction flow in each pair.

Thus there is still a long felt need for an efficient electric motor which maximizes mechanical power output for a give physical size by utilizing a comparable generator configuration.

SUMMARY OF THE INVENTION

Accordingly, a principal object of the present invention is to disclose an electric motor workable by applying voltage to an array of tilted electromagnetic coils affixed to the stator. The interaction between the magnetic fields of the tilted coils and corresponding tilted magnetic fields between matching pairs of magnetic device arrays generates a tilted force vector having a tangential component applying a rotational moment on the motor rotor. Thus, a generator configuration having vertical magnetic field and vertical coil configuration can be turned effortlessly into a motor via tilting the magnetic field of each device pair and likewise tilting the corresponding coils.

The configuration of powerful, distinct and uniform plurality of magnetic fields with high magnetic flux density and matching tilted coils utilizing most of the motor volume is adaptable to maximizing motor efficiency and mechanical power per given physical size of the motor.

In accordance with a preferred embodiment of the present invention, it is the object of the invention to disclose an electric motor comprising:
  (i) a plurality of surfaces with an array of magnets affixed on each surface accommodating a plurality of tilted magnetic fields between opposite pairs of offset magnetic devices located on any two adjacent surfaces.
  (ii) a plurality of stationary support structures each sustaining an electromagnetic coil array; each of the coils is disposed between each of the matching magnetic pairs.
  (iii) a rotating shaft affixed to the surfaces.

Electrical voltage applied to the coils creates within each coil a axial magnetic field. Interaction between the coil magnetic field and the magnetic field of a corresponding device pair creates a force vector directed axially with the tilted magnetic fields having a rotational moment component exerted on the magnetic array surfaces affixed to the rotating shaft.

Wherein the electric motor is adaptable to maximizing efficiency and mechanical power density by being configured with the powerful, distinct and uniform plurality of magnetic fields and matching electromagnetic coils.

It is one object of the present invention to provide an electric motor adapted to generate mechanical energy whilst increasing both the motor efficiency and the mechanical power density, wherein said electric motor comprising:

(i) a plurality of disk surfaces having a main longitudinal axis, each of which are coupled to an array of offset magnets; said magnets are arranged as matching magnetic pairs on two adjacent disk surfaces so as to create a plurality of magnetic fields between said matching magnetic pairs; said magnetic fields are titled at an angle A with respect to said main longitudinal axis;

(ii) a plurality of stationary support structures each having an electromagnetic coil array located in-between each of said matching magnetic pairs, adapted to provide an axial magnetic field when voltage is applied on said electromagnetic coil; each of said electromagnetic coil array is titled at said angle A with respect to said main longitudinal axis; and, (iii) a rotating shaft affixed to said disk surfaces.

It is another object of the present invention to provide the electric motor as defined above, wherein said angle A is higher than about 0° and lower than about 180°.

It is another object of the present invention to provide the electric motor as defined above, wherein said electric motor increases the power generation efficiency to about 90% according to IEC 60034-30.

It is another object of the present invention to provide the electric motor as defined above, wherein said electric motor increases the power generation efficiency to about 90% according to Edict 553/2005.

It is another object of the present invention to provide the electric motor as defined above, wherein the shape of said magnets are selected from a group consisting of circularly shape or polynomial shape.

It is another object of the present invention to provide the electric motor as defined above, comprising a variety of magnetic device sizes.

It is another object of the present invention to provide the electric motor as defined above, wherein said magnets are magnetic field sources made of a rare earth material as samarium or neodymium.

It is another object of the present invention to provide the electric motor as defined above, wherein said magnets are iron parts.

It is another object of the present invention to provide the electric motor as defined above, wherein said electric motor is configured so as to minimize air gaps between said magnets and said coils, and hence reduce magnetic field losses.

It is another object of the present invention to provide the electric motor as defined above, wherein said disk surface has a non magnetic layer so as said magnetic fields between each of said matching magnetic pairs are distinct and separate.

It is another object of the present invention to provide the electric motor as defined above, comprising a plurality of said coil support structures for suspending said coil arrays.

It is another object of the present invention to provide the electric motor as defined above, comprising coils wound in one direction or reversibly arranged in the array for optimizing generator efficiency.

It is another object of the present invention to provide the electric motor as defined above, wherein said magnetic device array is mounted on said disk surface.

It is another object of the present invention to provide the electric motor as defined above, wherein all said magnets on said disk surfaces have the same magnetic pole orientation.

It is another object of the present invention to provide the electric motor as defined above, wherein said magnetic pairs opposite poles create a magnetic field of attraction force.

It is another object of the present invention to provide the electric motor as defined above, wherein top surface of top disk and bottom surface of bottom disk contact the iron walls of the generator package so as to provide a low loss medium path to the magnetic field.

It is another object of the present invention to provide the electric motor as defined above, wherein the arrangement of said magnets on two adjacent radial lines is staggered.

It is another object of the present invention to provide the electric motor as defined above, wherein said magnets are arranged on arbitrarily shaped curved lines from the center of said disk out to the edge of said disk.

It is another object of the present invention to provide the electric motor as defined above, wherein said magnets are arranged on a spiraled line from the center of said disk to the edge of said disk.

It is another object of the present invention to provide the electric motor as defined above, wherein each of said matching magnetic pairs and coil tilt angle are equal for the entire motor.

It is another object of the present invention to provide the electric motor as defined above, wherein said tilt angles are different for various concentric rings on the disk surface.

It is another object of the present invention to provide the electric motor as defined above, wherein said electric motor is configured as a ball structure and comprising a first surface located on the inside of a first ball and a second surface located on the outside surface of a second ball located within said first ball.

It is another object of the present invention to provide the electric motor as defined above, wherein said electric motor is configured as an ellipsoid and comprising a first surface located on the inside of a first ellipsoid and a second surface located on the outside surface of a second ellipsoid located within said first ellipsoid.

It is another object of the present invention to provide the electric motor as defined above, comprising a first surface wave shaped located inside and a second wave shaped surface located on the outside It is another object of the present invention to provide the electric motor as defined above, wherein said first surface and said second surface are contacting said rotating shaft made of iron to provide a low loss medium path for the closing magnetic fields.

It is another object of the present invention to provide the electric motor as defined above, wherein each said stationary generator coils is placed in a direction defined by the magnetic field created between a pair of magnets.

It is another object of the present invention to provide a method for increasing the motor efficiency and the mechanical power density. The method comprises steps selected inter alia from:

a. providing a plurality of disk surfaces having a main longitudinal axis;
b. providing a plurality of arrays of offset magnets;
c. coupling said arrays of magnets to each of said disk surfaces such that a matching magnetic pairs on two adjacent disk surfaces are obtained so as a plurality of magnetic fields between said matching magnetic pairs are created; said magnetic fields are titled at an angle A with respect to said main longitudinal axis;

d. positioning a plurality of stationary support structures each having an electromagnetic coil array located in-between each of said matching magnetic pairs;

e. affixing a rotating shaft to said disk surfaces;

f. minimizing the size of air gaps between said coils and said magnets thereby minimizing the magnetic field losses and increasing said motor efficiency and said mechanical power density.

It is another object of the present invention to provide the method as defined above, additionally comprising the step of increasing the motor efficiency to about 90% according to IEC 60034-30.

It is another object of the present invention to provide the method as defined above, additionally comprising the step of increasing the motor efficiency to about 90% according to Edict 553/2005

It is another object of the present invention to provide the method as defined above, additionally comprising the step of adjusting said angle A to be higher than about 0° and lower than about 180°.

It is another object of the present invention to provide the method as defined above, additionally comprising the step of selecting the shape of said magnets from a group consisting of circularly shape or polynomial shape.

It is another object of the present invention to provide the method as defined above, additionally comprising the step of configuring said electric motor so as to minimize air gaps between said magnets and said coils, and hence reduce magnetic field losses.

It is another object of the present invention to provide the method as defined above, additionally comprising the step of coating said disk surface with a non magnetic layer so as said magnetic fields between each of said matching magnetic pairs are distinct and separate.

It is another object of the present invention to provide the method as defined above, additionally comprising the step of mounting said magnetic device array on said disk surface.

It is another object of the present invention to provide the method as defined above, additionally comprising the step of adjusting all said magnets on said disk surfaces to have the same magnetic pole orientation.

It is another object of the present invention to provide the method as defined above, additionally comprising the step of adjusting said magnetic pairs opposite poles so as to create a magnetic field of attraction force.

It is another object of the present invention to provide the method as defined above, additionally comprising the step of contacting the top surface of top disk and bottom surface of bottom disk with the iron walls of the generator package so as to provide a low loss medium path to the magnetic field.

It is another object of the present invention to provide the method as defined above, additionally comprising the step of arranging said magnets in arbitrarily shaped curved lines from the center of said disk out to the edge of said disk.

It is another object of the present invention to provide the method as defined above, additionally comprising the step of arranging said magnets in a spiraled line from the center of said disk to the edge of said disk.

It is still an object of the present invention to provide the method as defined above, additionally comprising the step of configuring said electric motor as a ball structure.

It is lastly an object of the present invention to provide the method as defined above, additionally comprising the step of configuring said electric motor as an ellipsoid.

BRIEF DESCRIPTION OF FIGURES

For a better understanding of the invention with regard to embodiments thereof, reference is made to the accompanying drawings, in which the numerals designate corresponding elements in sections throughout and in which.

DESCRIPTION OF THE PREFERRED EMBODIMENTS

Figure 1:
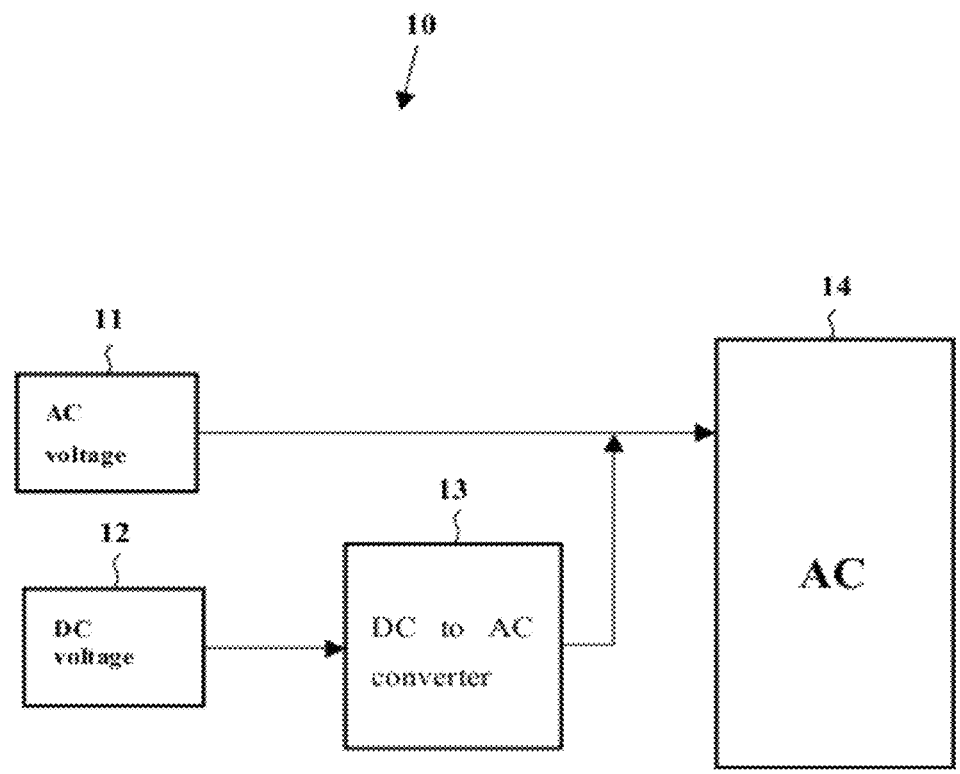
FIG. 1 illustrates a schematic block diagram of the motor and electrical AC or DC voltages driving the motor according to an embodiment of the present invention.

The following description is provided, alongside all chapters of the present invention, so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide an electric motor.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

The drawings set forth the preferred embodiments of the present invention. The embodiments of the invention disclosed herein are the best modes contemplated by the inventors for carrying out their invention in a commercial environment, although it should be understood that various modifications are accomplished within the parameters of the present invention.

The term 'electric motor' or 'motor' refers hereinafter in a non-limiting manner to a machine that converts electrical voltage into rotary mechanical force.

The term 'rotor' refers hereinafter in a non-limiting manner to the rotary portion of the motor rotating around the motor shaft.

The term 'stator' refers hereinafter in a non-limiting manner to the fixed portion of the motor applying magnetic field force on the rotor.

The term 'electromagnetic coil' or 'coil' refers hereinafter in a non-limiting manner to an element, which is made of a plurality of conductor wire windings around a ferromagnetic core.

The term 'coil support structure' or 'support structure' refers hereinafter in a non-limiting manner to a motor stator structure usable for sustaining the array of coils.

The term 'ferromagnetic core' refers hereinafter in a non-limiting manner to a material structure of substances such as iron, nickel, or cobalt and various alloys that exhibit extremely high magnetic permeability, a characteristic saturation point, and magnetic hysteresis.

The term 'permanent magnetic field source' refers hereinafter in a non-limiting manner to a device made of special material that produces a magnetic field for a long time all by itself.

The term 'magnetic device' or 'magnet' refers hereinafter in a non-limiting manner to a permanent magnetic field source or a matching iron part. A magnetic field is created between any matching magnetic pairs facing each other.

The term 'non magnetic material' relates hereinafter in a non-limiting manner to materials having the magnetic fields of the individual atoms randomly aligned and thus tend to cancel out.

The term "about" refers hereinafter to a range of 25% below or above the referred value. The term "International Electrotechnical Commission (IEC) 60034-30" refers hereinafter to a new standard developed by the IEC. 'IEC 60034-30, Efficiency Classes of single-speed three-phase cage induction motors'.

The aim of this standard is to provide a globally harmonized set of performance labels categorizing energy efficiency classes of single-speed three-phase cage induction motors. The scope of motors considered will be 3 phase cage induction motors at 50 Hz or 60 Hz that:

have a rated power between 0.75 kW and 200 kW;
have a rated voltage of up to 1000V;
be rated for continuous duty-S1;
be protection rated IP4x or higher;

The term "Edict 553/2005" refers hereinafter to an updated regulation, from the end of 2005. The first regulation of the "Energy Efficient Act" for electric motors, launched in 2002, established two sets of minimum efficiency performance standards (MEPS), for 'standard' (mandatory) and 'high efficiency' (voluntary) motors (see Agenor Gomes Pinto Garciaa, Alexandre S. Szkloa, Roberto Schaeffera and Michael A. McNeilb, "Energy-efficiency standards for electric motors in Brazilian industry", Energy Policy, Volume 35, Issue 6, June 2007, Pages 3424-3439).

The present invention is an electric motor workable by applying voltage to an array of tilted electromagnetic coils affixed to the stator. The interaction between the magnetic field of the tilted coils and corresponding tilted magnetic fields between any matching magnetic pairs creates a tilted force vector having a tangential component, which is applying a rotational moment on the motor rotor. Thus, an equivalent generator configuration having vertical magnetic field and vertical coils is turned into a motor via incorporating tilted magnetic fields between any matching magnetic pairs and disposing tilted coils between them.

The configuration of powerful, distinct and uniform plurality of magnetic fields with high magnetic field density and matching tilted coils utilizing most of the motor volume is adaptable to maximizing motor efficiency and mechanical power per given physical size of the motor.

Reference is now made to FIG. 1, a schematic block diagram of the motor system 10. Motor 14, which is an embodiment of the invention, is an AC motor driven by AC voltage. If an AC voltage source 11 is available, motor 14 is driven directly by the AC voltage. Alternatively, if a DC voltage source 12 is the driving voltage, an electronic DC to AC converter module 13, commonly known in the art, converts DC voltage 12 into an AC voltage. The stator of motor 14, consists of array pairs of magnets (matching magnetic pairs) affixed to adjacent surfaces facing each other. The stator of the motor 14 consists of an array of matching electromagnetic coils disposed between a corresponding matching magnetic pairs. When AC voltage is applied to the coils, a horizontal vector force component applied to the rotor rotates the rotor around the rotor shaft.

Figure 2:
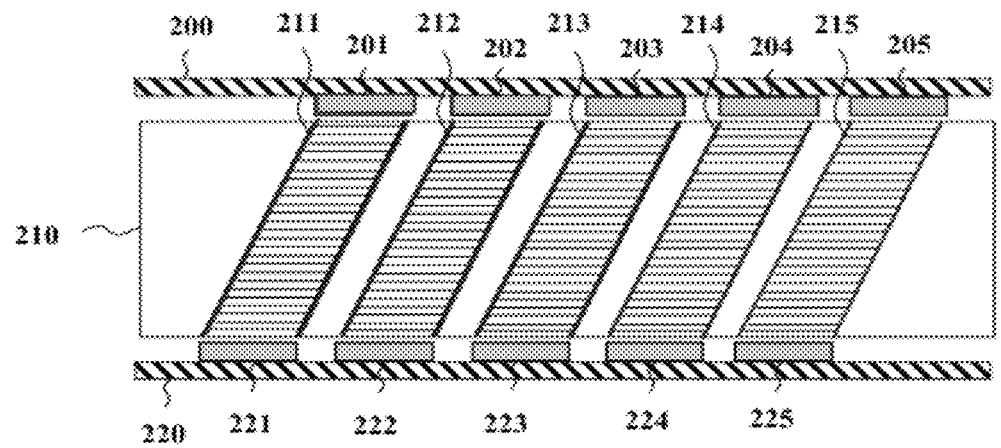
FIG. 2 illustrates a non-dimensionally scaled cross sectional view of an array of matching magnetic pairs disposed on too adjacent surfaces of a motor rotor and an array of tilted coils disposed on the motor stator between each matching magnetic pairs according to an embodiment of the present invention.

Reference is now made to FIG. 2, a non-dimensionally scaled cross sectional partial view of a cylindrically shaped motor embodiment of the invention. Magnets 201, 202, 203, 204 and 205, which are affixed to disk 200, denote a two-dimensional array of magnets. Likewise, magnets 221, 222, 223, 224 and 225, which are affixed onto disk 220, denote a two-dimensional array of magnets. Magnet 201 affixed to disk 200 constitutes a pair of magnet 221 affixed to disk 200 (matching magnetic pairs).

Each magnet affixed to disk 200 has a matching magnetic pair affixed to disk 220. The pairs of magnets are offset to each other. Consequently, each matching magnetic pairs applies a tilted magnetic field. Any offset between the matching magnetic pairs creates a tilted magnetic field between them. If the projection of the offset on the disk plane is not along a radial line, a tangential force is exerted on the disk. For example, matching magnetic pairs 201 and 221, magnet 202 and magnet 222, magnet 203 and magnet 223, magnet 204 and magnet 224, magnet 205 and magnet 225 are offset to each other by the same amount and direction, have magnetic fields between them tilted the same way. The tilt angle can be of any value greater than 0° and up to 180° with respect to the main longitudinal axis of the disk.

The depicted motor includes three disks with four magnetic array surfaces. Nonetheless, any practical number of disks used is within the scope of the invention.

Electromagnetic coils 211, 212, 213, 214 and 215 disposed within stator support structure 210 are tilted the same way as the magnetic fields between the matching magnetic pairs and have a similar physical size.

When an electrical voltage is applied to the array of stator coils, the interaction between the tilted magnetic fields of all the matching magnetic pairs and the electromagnetic fields generated by the voltage applied to the coils, exert a force vectors between each matching magnetic pairs and the corresponding coil, which is directed at the same tilt angle. The force vectors have vertical and horizontal components. The horizontal components of the force vector exert a rotational moment on the motor rotor.

The tilt angle, which can have any value between greater than 0° up to 180° in any direction with respect to the main longitudinal of the disk, may differ on various locations within the motor volume, for optimizing motor operation and efficiency.

The magnet may have a polygon or circular shape and is either a magnetic field source, commonly fabricated from a rare earth material as samarium, neodymium or a part made of iron. The structure is packaged within an ironed wall package with low magnetic losses, which are used to close the magnetic field lines while minimizing losses.

The disks are made of magnetic materials contacting the iron made motor shaft and iron made motor enclosure for providing low magnetic resistance path to the magnetic field of each pair. Air gaps between coils and the corresponding matching magnetic pairs of the arrangement are minimized for minimizing magnetic field losses through them.

High magnetic flux density created by a plurality of matching magnetic pairs, a dense structure of matching magnetic pairs and matching generator coils, minimal size of air gaps between the coils and the magnets minimizing magnetic field losses, are adaptable in this invention for providing high efficiency and high power density electric motor.

Figure 3A:
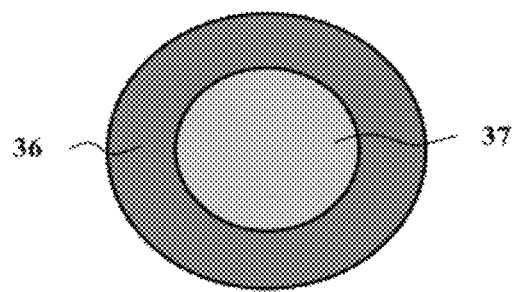
FIG. 3a illustrates a non-dimensionally scaled top view of a motor disk consisting of two concentric areas accommodating two different magnetic field tilts according to an embodiment of the present invention.

Reference is now made to FIG. 3*a*, a top view of a disk. All the magnets of section 36 form a first magnetic field tilt angle with their matching magnetic pair. Likewise, all magnets of section 37 form a second magnetic field tilt angle with their matching magnetic pairs. Consequently, different forces are applied at the two sections usable for optimizing motor operation.

Winding of electromagnetic coils can be made in two opposite directions creating opposite magnetic fields and consequently opposite force vectors. In one embodiment the array of coils may include reversibly wound coils arranged by way of optimizing motor-generator efficiency.

Figure 3B:
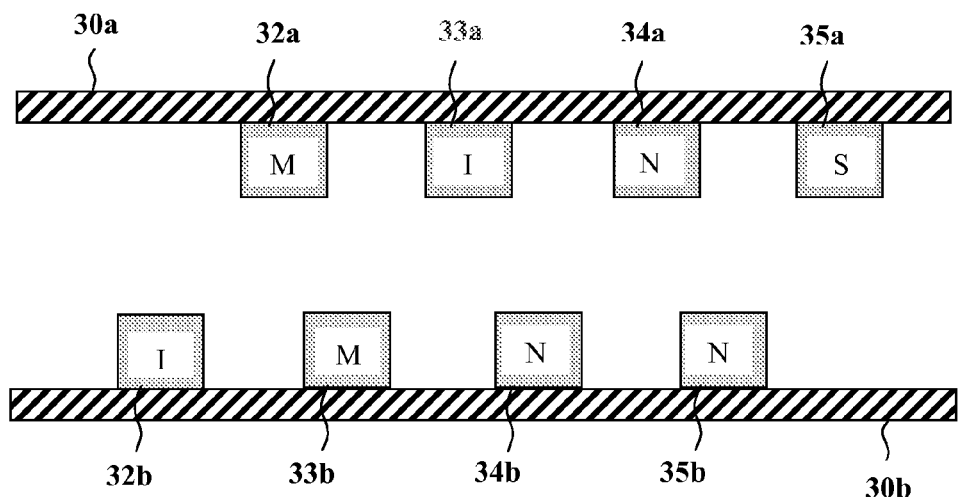
FIG. 3b illustrates a non-dimensionally scaled cross-sectional view of two adjacent surfaces including four different pairs of different devices facing each other according to an embodiment of the present invention.

Reference is now made to FIG. 3*b* a cross sectional view of two adjacent disks having pairs of magnets facing each other affixed to them arranged as spatially offset pairs. Magnet 35*a* affixed to disk 30*a* and magnet 35*b* affixed to disk 30*b*, are pair of permanent field sources. Permanent magnetic source 35*b* has a north magnetic pole facing upward and offset permanent magnetic source 35*a* has a south magnetic pole facing downward. Consequently, the magnetic field between this pair creates a tilted attraction force.

Magnet 34*a* and magnet 34*b* are permanent magnets offset to each other with their common north poles. Consequently, the magnetic field between this pair creates a tilted repelling force.

Magnet 33*a* is an iron part and magnet 33*b* is a permanent magnetic field source of any pole direction. A tilted magnetic field is generated between this pair of magnets by the iron part 33*a* being magnetized by the permanent magnetic field source 33*b*.

Magnet 32*a* is a permanent magnetic field source and magnet 32*b* is a part of iron. Thus this pair of magnets is arranged opposite to the pair of magnets 33*a* and 33*b* and has a tilted magnetic field as well.

Figure 3C:
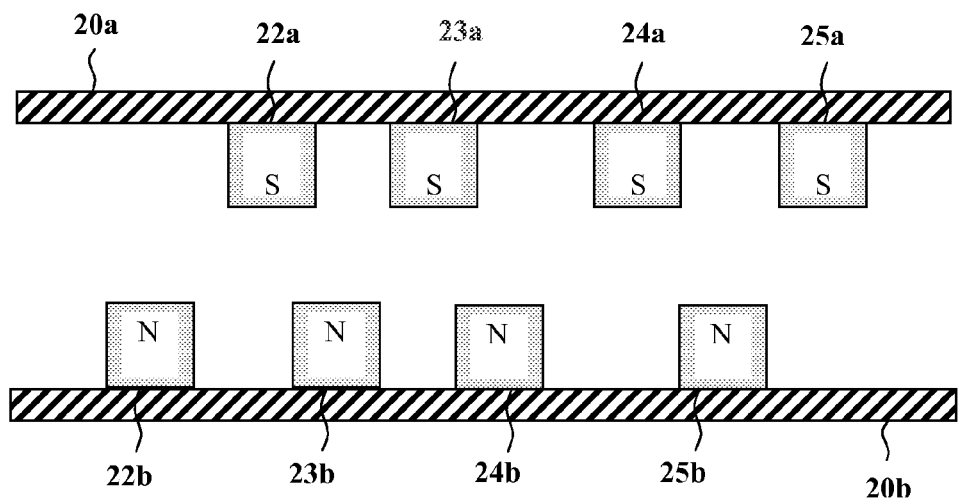
FIG. 3c illustrates a non-dimensionally scaled cross-sectional view of two adjacent surfaces including four pairs of magnets facing each other, according to an embodiment of the invention, where all magnets have the same pole orientation.

FIG. 3*c* is a cross-sectional view of an embodiment of the invention according to which magnets 22*a*, 23*a*, 24*a* and 25*a*, mounted on disk 20*a*, and magnets 22*b*, 23*b*, 24*b* and 25*b*, mounted on disk 20*a*, are all oriented in the same direction.

The magnetic field of an electromagnetic coil disposed between the matching magnetic pairs and applied with an electrical voltage, interacts with the tilted magnetic field of the matching magnetic pairs. The offset between matching magnetic pairs does not coincide with a disk radial line. Consequently, the interaction between the magnetic field of the matching magnetic pairs and the magnetic field of the related coil creates a force vector having a tangential component on the disk exerting a rotational moment on the motor rotor.

An optimum design of different matching magnetic pairs and tilt combinations leads to a preferred system performance.

Figure 4:
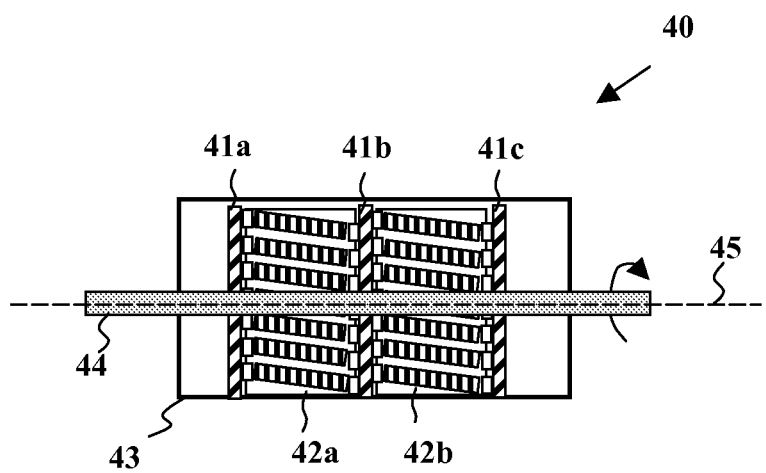
FIG. 4 illustrates a non-dimensionally scaled cross sectional view of a cylindrically shaped motor having three disks with four surfaces affixed with arrays of magnetic devices and a support structure between each adjacent disks used for supporting a plurality of electromagnetic coils according to an embodiment of the present invention.

Reference is now made to FIG. 4, a cross sectional view of cylindrically shaped motor 40. The rotor of motor consists of disks 41*a*, 41*b* and 41*c*, which are affixed to rotating shaft 44. An array of magnets is affixed to first surface of top disk 41*a*. First array of magnets is affixed to first side of disk 41*b* and second array of magnets is affixed to second surface of disk 41*b*. An array of magnets is affixed to bottom disk 41*c*. The array affixed to disk 41*a* faces first array of disk 41*b* and devices facing each other constitute matching magnetic pairs having a magnetic field between them. Likewise, the second array affixed to second surface of disk 41*b* is facing the array affixed to disk 41*c* and devices facing each other constitute matching magnetic pairs having a magnetic field between them. Inasmuch the matching magnetic pairs are offset to each other, the magnetic fields between the matching magnetic pairs are tilted with respect to the main longitudinal axis 45 of shaft 44. Motor stator includes coil support structures 42*a* and 42*b*. Coil support structure 42*a* sustains a plurality of electromagnetic coils. Each coil tilted as the magnetic field between the corresponding magnet pair. Likewise, coil support structure 42*b* sustains a plurality of electromagnetic coils. Each coil tilted as the magnetic field between the corresponding magnet pair. Motor 40 is packaged within an ironed wall package 43. The top surface of top disk 41*a* and the bottom surface of bottom disk 41c contact the iron walls of package 43 so as to provide a low loss medium path to the magnetic field.

When voltage is applied to all the coils, it creates a magnetic field in each of the coils. The interaction between the magnetic fields of the plurality of matching magnetic pairs and the magnetic fields of the corresponding coils creates a plurality of force vectors having tangential components exerting a rotational moment to the motor rotor.

The configuration accommodates high electrical to mechanical energy conversion efficiency attributable to low losses along with high mechanical power density due to effective utilization of the generator volume.

Figure 5A:
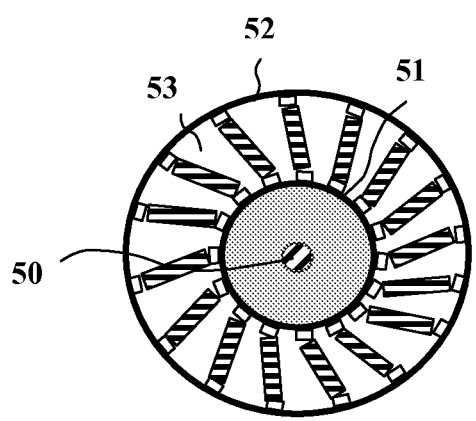
FIG. 5a illustrates a non-dimensionally scaled cross sectional view of a motor configured as a first ball having an array of magnetic devices affixed to the outer surface within a second ball having an array of magnetic devices affixed to the inner surface and a support structure disposed between the surfaces for supporting a plurality of electromagnetic coils according to an embodiment of the present invention.

Reference is now made to FIG. 5a, a cross sectional view of a ball shaped motor. The rotor of the motor includes an outer ball surface 52 and an inner ball surface 51. An array of magnets is affixed to inner surface 52. Likewise, an array of magnets is affixed to outer surface 51. Each magnet on outer surface 51 has a mating magnet on inner surface 52 and the mating devices facing each other constitute matching magnet. The magnetic fields between any pair of magnets are tilted in the same direction with respect to the radial lines. The motor stator includes coil support structure 53, sustaining an array of electromagnetic coils. Each coil corresponding to a matching magnetic pair, is tilted the same direction as the magnetic field of the corresponding pair. When an electrical voltage is applied to the coils, the interaction between the magnetic field of a matching magnetic pairs and the magnetic field of the corresponding coil exerts a force vector directed parallel to the magnetic field. The force vector has a tangential component applying a rotational moment, which rotates the motor rotor around motor shaft 50.

Figure 5B:
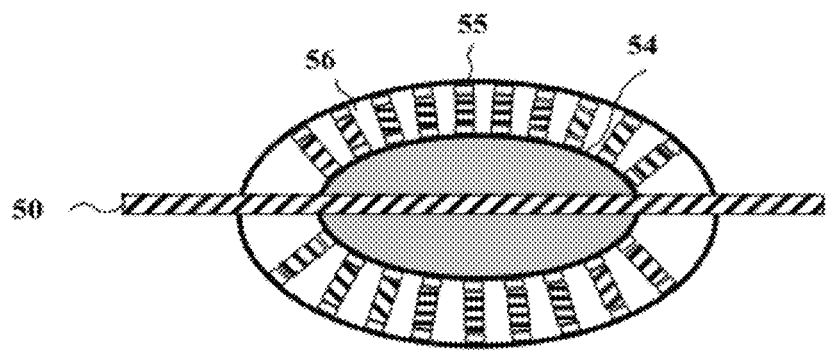
FIG. 5b illustrates a non-dimensionally scaled cross sectional view of a motor configured as a first ellipsoid having an array of magnetic devices affixed to the outer surface within a second ellipsoid having an array of magnetic devices affixed to the inner surface and a support structure disposed between the surfaces for supporting a plurality of electromagnetic coils according to an embodiment of the present invention.

Reference is now made to FIG. 5b an ellipsoid shaped motor. The ellipsoid shape is a variation of the ball shaped motor in FIG. 5a. First array of magnets is affixed to inner surface 55, which is part of the motor rotor. Second array of magnets is affixed to outer surface 54, which is part of the motor rotor. Each magnet of the first array has a matching magnetic pair in the second array. All the matching magnetic pairs are tilted in a direction out of the plane of FIG. 5b and the magnetic field of each pair is tilted the same way.

Coil support structure 55, sustains an array of electromagnetic coils, correlated to the array of matching magnetic pairs. Each coil is tilted in the direction of the magnetic field between the corresponding matching magnetic pairs, i.e. coil tilt is directed out of the plane of FIG. 5b.

When an electric voltage is applied to the coils, the electromagnetic coils create an axial magnetic field. The interaction between the magnetic field of a matching magnetic pairs and the magnetic field of the corresponding coil exerts a coaxial force vector. The force vector has a tangential component applying a rotational moment, which rotates the motor rotor around motor shaft 50.

Figure 5C:
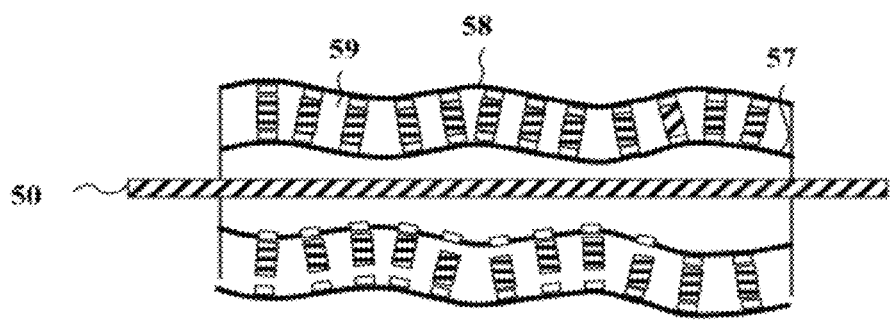
FIG. 5c illustrates a non-dimensionally scaled cross sectional view of a motor configured with a first wave shaped surface having an array of magnetic devices affixed to the outer surface within a second wave shaped surface having an array of magnetic devices affixed to the inner surface and a support structure disposed between the surfaces for supporting a plurality of electromagnetic coils according to an embodiment of the present invention.

FIG. 5c is a cross sectional view of a motor configured by a pair of arbitrary wave shaped surfaces. First array of magnets is affixed to inner surface 58, which is part of the motor rotor. Second array of magnets is affixed to outer surface 57, which is part of the motor rotor. Each magnetic of the first array has a matching magnetic pairs of the second array. All the matching magnetic pairs are tilted in a direction out of the plane of FIG. 5b and the magnetic field of each pair is tilted the same way.

Coil support structure 59, sustaining an array of electromagnetic coils, correlated with the array of matching magnetic pairs. Each coil is tilted in the direction of the magnetic field between the corresponding matching magnetic pairs, i.e. coil tilt is directed out of the plane of FIG. 5b.

When an electric voltage is applied to the coils, the electromagnetic coils create a magnetic field directed as the coils. The interaction between the magnetic field of a matching magnetic pair and the magnetic field of the corresponding coil exerts a force coaxial vector. The force vector has a tangential component applying a rotational moment, which rotates the motor rotor around motor shaft 50.

Figure 6A:
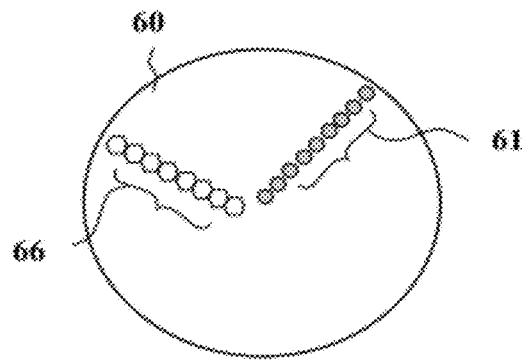
FIG. 6a illustrates a non-dimensionally scaled top view of a disk surface having an array of equally sized magnetic devices affixed to the surface and arranged along radial lines from the center to the edge.

Reference is now made to FIG. 6a, which is a top view of a disk of the cylindrically shaped motor depicted in FIG. 4, showing an embodiment of the magnets arrangement on motor disk 60. An array of magnets can be arranged staggered along adjacent radial lines on the disk. For example, the line of roundly shaped magnets 61 are arranged along a radial line and an adjacent line of magnets are staggered with respect to radial line 61. Likewise, a line of hex shaped magnets 66 can be arranged along a radial line. Adjacent hex shaped radial lines do not have to be staggered by fitting well side by side on adjacent radial lines.

The disk material is magnetic to provide low magnetic field resistance to the magnetic field of the magnets. The disk surface is coated with a non-magnetic material for accommodating magnetic isolation between the magnets. The magnetic disk contacts the iron made shaft and motor enclosure for providing low magnetic field resistance to the matching magnetic pairs.

Figure 6B:
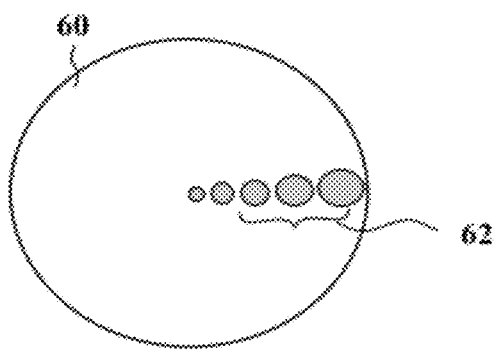
FIG. 6b illustrates a non-dimensionally scaled top view of a disk surface having an array of magnetic devices affixed to the surface and arranged along radial lines while growing in size from the center to the edge.

Reference is now made to FIG. 6b, which is a top view of a disk of the cylindrically shaped motor depicted in FIG. 4. showing an embodiment of device arrangement on motor disk 60. An array of magnets can be arranged along radial lines on the disk. For example, the line of roundly shaped magnets 62 are arranged along a radial line. The magnets, arranged along a radial line have a gradual size increase. This allows an easier arrangement of magnets along adjacent radial lines.

The disk material is magnetic to provide low magnetic field resistance to the magnetic field of the magnets. The disk surface is coated with a non-magnetic material for accommodating magnetic isolation between the magnets. The magnetic disk contacts the iron made motor enclosure for providing low magnetic field resistance to the matching magnetic pairs.

Figure 6C:
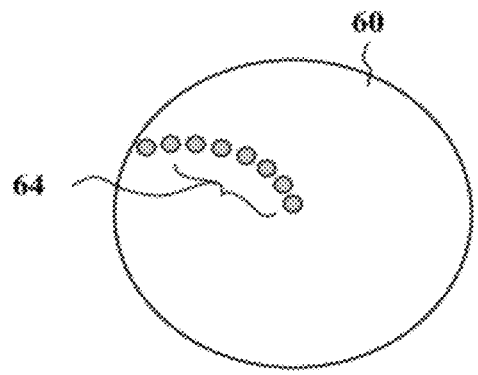
FIG. 6c illustrates a non-dimensionally scaled top view of a disk surface having an array of equally sized magnetic devices affixed to the surface and arranged along curved lines from the center to the edge and FIG. 6d illustrates a non-dimensionally scaled top view of a disk surface having an array of equally sized magnetic devices affixed to the surface and arranged along a spiraled line from the center to the edge.

Reference is now made to FIG. 6c, which is a top view of a disk of the cylindrically shaped motor depicted in FIG. 4, showing another magnets arrangement on motor disk 60. An array of magnets is arranged along a curved line from the disk surface to the disk edge, rather than along straight radial line, as in the preceding figures.

The disk material is magnetic to provide low magnetic field resistance to the magnetic field of the magnets. The disk surface is coated with a non-magnetic material for accommodating magnetic isolation between the magnets. The magnetic disk contacts the iron made motor enclosure for providing low magnetic field resistance to the matching magnetic pairs.

Figure 6D:
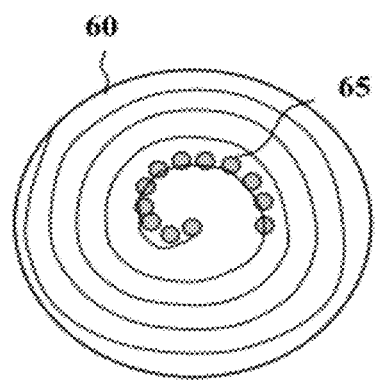

Reference is now made to FIG. 6d, which is a top view of a disk of the cylindrically shaped motor depicted in FIG. 4, showing another magnets arrangement on motor disk 60. An array of magnets is arranged along a spiral 65 starting at the disk center and extending all the way to the disk edge.

The disk material is magnetic to provide low magnetic field resistance to the magnetic field of the magnets. The disk surface is coated with a non-magnetic material for accommodating magnetic isolation between the magnets. The magnetic disk contacts the iron made motor enclosure for providing low magnetic field resistance to the matching magnetic pairs.

The magnets' arrangement embodiment within the scope of the invention may include a plurality device sizes and shapes, which can be arranged differently as arrays of magnets.

Embodiments of various magnetic field tilt of matching magnetic pairs are within the scope of the invention.

It will be appreciated that the formerly described methods may be varied in many ways including, changing the order of steps, and/or performing a plurality of steps concurrently.

It should also be appreciated that the above described description of methods and apparatus are to be interpreted as including apparatus for carrying out the methods, and methods of using the apparatus.

For the main embodiments of the invention, the particular selection of type and model is not critical, though where specifically identified, this may be relevant. The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and steps described with respect to one embodiment may be used with other embodiments and that not all embodiments of the invention have all of the features and/or steps shown in a particular figure or described with respect to one of the embodiments. That is, the disclosure should be considered complete from combinatorial point of view, with each embodiment of each element considered disclosed in conjunction with each other embodiment of each element (and indeed in various combinations of compatible implementations of variations in the same element). Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims.

It is noted that some of the above described embodiments may describe the best mode contemplated by the inventors and therefore may include structure, acts or details of structures and acts that may not be essential to the invention and which are described as examples. Structure and acts described herein are replaceable by equivalents performing the same function, even if the structure or acts are different, as known in the art. Therefore, the scope of the invention is limited only by the elements and limitations as used in the claims.

The invention claimed is:

1. An electric motor adapted to generate mechanical energy whilst increasing both the motor efficiency and the mechanical power density, wherein said electric motor comprising:
    a. a rotating shaft having a main longitudinal axis;
    b. a plurality of disk surfaces affixed to said rotating shaft, each of which is coupled to an array of offset magnets; said magnets are arranged as matching magnetic pairs on two adjacent disk surfaces so as to create a plurality of magnetic fields between said matching magnetic pairs; each of said magnetic fields is titled at a respective tilt angle with respect to said main longitudinal axis; and
    c. a plurality of stationary support structures each having an array of electromagnetic coils, adapted to provide magnetic field when voltage is applied on said electromagnetic coils; each of said electromagnetic coils is located in-between a corresponding matching magnetic pair and is titled with respect to said main longitudinal axis at the same tilt angle as of the magnetic field created between said corresponding matching magnetic pair.

2. The electric motor according to claim 1, wherein said tilt angle is higher than about 0° and lower than about 180°.

3. The electric motor according to claim 1, wherein at least one of the following is being held true (a) the shape of said magnets are selected from a group consisting of circularly shape or polynomial shape; (b) said electric motor comprising a variety of magnetic device sizes; (c) said magnets are made of a rare earth material including samarium or neodymium; (d) said magnets are iron parts; (e) said electric motor is configured so as to minimize air gaps between said magnets and said coils, and hence reduce magnetic field losses; (f) said disk surface has a non magnetic layer so as said magnetic fields between each of said matching magnetic pairs are distinct and separate.

4. The electric motor according to claim 1, wherein said coil arrays comprise coils wound in one direction or coils wound in two opposite directions arranged in the array for optimizing motor efficiency.

5. The electric motor according to claim 1, wherein all said magnets on said disk surfaces have the same magnetic pole orientation.

6. The electric motor according to claim 1, wherein opposite poles of said magnetic pairs create a magnetic field of attraction force.

7. The electric motor according to claim 1, packaged within an ironed wall package, wherein top surface of top disk and bottom surface of bottom disk contact the iron walls of the package so as to provide a low loss medium path to the magnetic field.

8. The electric motor according to claim 1, wherein the arrangement of said magnets on two adjacent radial lines is staggered.

9. The electric motor according to claim 1, wherein said magnets are arranged on arbitrarily shaped curved lines from the center of said disk out to the edge of said disk.

10. The electric motor according to claim 1, wherein each of said matching magnetic pairs and coil tilt angle are equal for the entire motor.

11. The electric motor according to claim 1, wherein said tilt angles are different for various concentric rings on the disk surface.

12. A method for increasing a motor efficiency and mechanical power density, comprising steps of:
    a. providing a plurality of disk surfaces having a main longitudinal axis;
    b. providing a plurality of arrays of offset magnets;
    c. coupling said arrays of offset magnets to each of said disk surfaces such that a matching magnetic pairs on two adjacent disk surfaces are obtained so as a plurality of magnetic fields between said matching magnetic pairs are created; said magnetic fields are titled at an angle A with respect to said main longitudinal axis;
    d. positioning a plurality of stationary support structures each having an electromagnetic coil array located in-between each of said matching magnetic pairs such that each of said electromagnetic coil array is titled at said angle A with respect to said main longitudinal axis; and
    e. affixing a rotating shaft to said disk surfaces.

13. The method according to claim 12, additionally comprising at least one step selected from a group consisting of (a) increasing the motor efficiency to about 90% according to IEC 60034-30; (b) increasing the motor efficiency to about 90% according to Edict 553/2005; (c) adjusting said angle A to be higher than about 0° and lower than about 180° ; (d) selecting the shape of said magnets from a group consisting of circularly shape or polynomial shape; (e) configuring said electric motor so as to minimize air gaps between said magnets and said coils, and hence reduce magnetic field losses; (f) coating said disk surface with a non magnetic layer so as said magnetic fields between each of said matching magnetic pairs are distinct and separate; (g) mounting said magnetic device array on said disk surface; and any combination thereof 14. The method according to claim 12, additionally comprising at least one step selected from a group consisting of (a) adjusting all said magnets on said disk surfaces to have the same magnetic pole orientation; (b) adjusting said magnetic pairs opposite poles so as to create a magnetic field of attraction force; (c) contacting the top surface of top disk and bottom surface of bottom disk with the iron walls of the generator package so as to provide a low loss medium path to the magnetic field; (d) arranging said magnets in arbitrarily shaped curved lines from the center of said disk out to the edge of said disk; (e) arranging said magnets in a spiraled line from the center of said disk to the edge of said disk; (f) configuring said electric motor as a ball structure; (g) configuring said electric motor as an ellipsoid; and any combination thereof 15. The method according to claim 12 further comprising a step of minimizing the size of air gaps between said coils and said magnets thereby minimizing the magnetic field losses and increasing said motor efficiency and said mechanical power density.

16. An electric motor adapted to generate mechanical energy whilst increasing both the motor efficiency and the mechanical power density, wherein said electric motor comprising:
  a. a rotating shaft having a main longitudinal axis;
  b. a plurality of disk surfaces affixed to said rotating shaft, each of which is provided with an array of offset magnets mounted thereon and arranged on a spiraled line from the center of the disk to the edge of said disk; said magnets are arranged as matching magnetic pairs on two adjacent disk surfaces so as to create a plurality of magnetic fields between said matching magnetic pairs; said magnetic fields are titled at an angle A with respect to said main longitudinal axis; and
  c. a plurality of stationary support structures, each having an array of electromagnetic coils located in-between each of said matching magnetic pairs, adapted to provide an axial magnetic field when voltage is applied on said electromagnetic coil; each of said electromagnetic coils is titled at said angle A with respect to said main longitudinal axis.

* * * * *